(12) United States Patent
Grishin et al.

(10) Patent No.: US 7,970,026 B2
(45) Date of Patent: Jun. 28, 2011

(54) MULTIPLE OUTPUT REPETITIVELY PULSED LASER

(75) Inventors: Mikhail Grishin, Vilnius (LT); Andrejus Michailovas, Vilnius (LT)

(73) Assignee: Ekspla Ltd. (LT)

( * ) Notice: Subject to any disclaimer, the term of this patent is extended or adjusted under 35 U.S.C. 154(b) by 26 days.

(21) Appl. No.: 12/649,732

(22) Filed: Dec. 30, 2009

(65) Prior Publication Data
US 2010/0135341 A1   Jun. 3, 2010

Related U.S. Application Data

(62) Division of application No. 11/744,625, filed on May 4, 2007, now abandoned.

(51) Int. Cl.
*H01S 3/10* (2006.01)
(52) U.S. Cl. ............... 372/25; 372/12; 372/18; 372/10; 372/29.02; 372/30; 372/31
(58) Field of Classification Search ............. 372/25, 372/12, 18, 10, 29.02, 30, 31
See application file for complete search history.

(56) References Cited

U.S. PATENT DOCUMENTS

| | | | |
|---|---|---|---|
| 3,757,249 A | 9/1973 | Johnson et al. | |
| 3,978,429 A | 8/1976 | Ippen et al. | |
| 3,995,231 A | 11/1976 | Johnson et al. | |
| 4,044,316 A | 8/1977 | Kennedy | |
| 4,337,442 A | 6/1982 | Mauck | |
| 4,375,684 A | 3/1983 | Everett | |
| 5,040,182 A | 8/1991 | Spinelli et al. | |
| 5,128,601 A | 7/1992 | Orbach et al. | |
| 5,226,051 A | 7/1993 | Chan et al. | |
| 5,291,505 A | 3/1994 | Nielsen | |
| 5,293,025 A | 3/1994 | Wang | |

(Continued)

FOREIGN PATENT DOCUMENTS

WO   WO-2005/038994   4/2005

(Continued)

OTHER PUBLICATIONS

A. Killi, U. Morgner, M. J. Lederer and D. Kopf, "Diode-pumped femtosecond laser oscillator with cavity dumping", Optics Letters, Jun. 1, 2004, pp. 1288-1290, vol. 29, No. 11.

(Continued)

*Primary Examiner* — Kinam Park
(74) *Attorney, Agent, or Firm* — Altera Law Group, LLC

(57) ABSTRACT

A continuously pumped, mode-locked laser is disclosed, which includes a cavity dumper that can remove a constant fraction of the light from the cavity at every 1/f period of time, independent of the time at which the first pulse in a train is initiated. The cavity dumper includes a modulator and two output arms, denoted as a primary output arm and a secondary output arm. When a user desires a train of pulses, the pulses are directed to the primary output arm. Between trains of pulses, when no pulse is desired by the user, the pulses are directed to the secondary output arm, which terminates in an absorber or at a secondary optical system. In this manner, the energy contained in each output pulse is essentially constant, from pulse-to-pulse and from train-to-train. This may overcome the disadvantage of many lasers that have a single output arm, in which the first pulse in a train may have an energy that depends on the length of the inactive period that immediately precedes the train.

7 Claims, 13 Drawing Sheets

U.S. PATENT DOCUMENTS

| | | | |
|---|---|---|---|
| 5,339,323 | A | 8/1994 | Hunter et al. |
| 5,361,268 | A | 11/1994 | Fossey et al. |
| 5,635,089 | A | 6/1997 | Singh et al. |
| 5,720,894 | A | 2/1998 | Neev |
| 5,812,569 | A | 9/1998 | Walker et al. |
| 5,830,514 | A | 11/1998 | Barenboim et al. |
| 5,870,421 | A | 2/1999 | Dahm |
| 5,982,790 | A | 11/1999 | Grossman et al. |
| 6,009,110 | A | 12/1999 | Wiechmann et al. |
| 6,016,324 | A | 1/2000 | Rieger et al. |
| 6,038,241 | A | 3/2000 | von Elm et al. |
| 6,150,630 | A | 11/2000 | Perry et al. |
| 6,188,704 | B1 | 2/2001 | Kwon et al. |
| 6,259,719 | B1 | 7/2001 | Cunningham et al. |
| RE37,585 | E | 3/2002 | Mourou et al. |
| 6,376,797 | B1 | 4/2002 | Piwczyk et al. |
| 6,393,035 | B1 | 5/2002 | Weingarten et al. |
| 6,414,980 | B1 | 7/2002 | Wang et al. |
| 6,580,732 | B1 | 6/2003 | Guch, Jr. et al. |
| 6,720,519 | B2 | 4/2004 | Liu et al. |
| 6,878,899 | B2 | 4/2005 | Smart |
| 6,879,605 | B2 | 4/2005 | Kyusho et al. |
| 6,931,035 | B2 | 8/2005 | Wang |
| 6,969,822 | B2 | 11/2005 | Pollard |
| 6,979,798 | B2 | 12/2005 | Gu et al. |
| 7,082,145 | B2 | 7/2006 | Palmer et al. |
| 2004/0101002 | A1 | 5/2004 | Ukita et al. |
| 2004/0134894 | A1* | 7/2004 | Gu et al. ............... 219/121.68 |
| 2005/0185682 | A1 | 8/2005 | Jacinavicius et al. |
| 2005/0274702 | A1 | 12/2005 | Deshi |
| 2006/0045150 | A1 | 3/2006 | Newman et al. |
| 2007/0104230 | A1* | 5/2007 | Kopf et al. ....................... 372/9 |

FOREIGN PATENT DOCUMENTS

| | | |
|---|---|---|
| WO | WO-2005/057741 | 6/2005 |

OTHER PUBLICATIONS

A. Killi et al., "High speed electro-optical cavity dumping of mode-locked laser oscillators", Optics Express, Mar. 21, 2005, pp. 1916-1922, vol. 13, No. 6.

D. Breitling et al., "Fundamental aspects in machining of metals with short and ultra short laser pulses," Proc. of SPIE 5339, pp. 49-63 (2004).

R. Stoian et al., "Surface charging and impulsive ion ejection during ultrashort pulsed laser ablation", Physical Review Letters, Mar. 4, 2002, pp. 097603-1/4, vol. 88, No. 9.

F. Dausinger et al., "Micro-machining with ultrashort laser pulses: From basic understanding to technical applications", Proc. of SPIE 5147, pp. 106-115 (2003).

A. Nebel et al., "Generation of tailored picosecond-pulse-trains for micro-machining", Proc. of SPIE 6108, pp. 226-233 (2006).

A. Killi and U. Morgner, "Solitary pulse shaping dynamics in cavity-dumped laser oscillators", Opt. Express 12, pp. 3397-3407 (2004).

R. Smilingis et al., "Diode-pumped Nd:YVO4 picosecond laser oscillator with high speed electro optical cavity dumping", 2nd EPS-QEOD Europhoton Conference, Poster ThC2 (2006).

W. Koechner, "Solid state laser engineering," 3rd ed. (Springer-Verlag, Berlin 1992), pp. 482-507.

* cited by examiner (a)

(b)

(c)

(d)

(e)

(f)

(g)

(h)

MULTIPLE OUTPUT REPETITIVELY PULSED LASER

CROSS-REFERENCE TO RELATED APPLICATIONS

This application is a divisional of application Ser. No. 11/744625, filed 4 May 2007 now abandoned. The application is incorporated herein by reference.

STATEMENT REGARDING FEDERALLY SPONSORED RESEARCH OR DEVELOPMENT

Not Applicable

BACKGROUND OF THE INVENTION

1. Field of the Invention

The present invention is directed to stabilizing the output pulse energy in a continuously pumped, repetitively cavity-dumped laser.

2. Description of the Related Art

A laser, in its simplest configuration, operates in a "continuous wave" mode, in which the power output is relatively constant over time. For many applications, such as cutting, drilling, and investigation of media properties, it would be beneficial to use a pulsed laser, in which the power output is extremely high over a very short period of time. In such a pulsed laser, the output power is effectively "stored up" in the laser cavity over a period of time, then released in a short pulse. During the duration of the laser pulse, known as the pulse width or pulse duration, the output power of the laser may be many orders of magnitude larger than the continuous wave output power. A preferable method of generating these short pulses is known as mode locking. Mode locked lasers can routinely produce pulses with durations of picoseconds.

It is often desirable to boost the energy contained in these pulses without significantly affecting the pulse durations. A common technique for generating microjoule level pulses without using complex and expensive amplifier schemes is known as "cavity dumping".

In cavity dumping, the basic idea is to keep the optical losses of the laser cavity as low as possible for some time, so that an intense pulse builds up in the cavity, then to extract this pulse within about one cavity round-trip time using an optical switch, which may be acousto-optic or electro-optic. The switch may be referred to as a "cavity dumper." Cavity dumping is explained in greater detail in the following paragraphs.

A laser cavity used for cavity dumping is similar to that used for Q-switching, but containing only highly reflecting mirrors (i.e., no partially transmissive output coupler mirror). Output coupling is controlled with the optical switch in the cavity, typically a combination of an electro-optic modulator (EOM) and a polarizer, which is quickly turned on for pulse extraction and then directs the intracavity beam into the output. At times other than during pulse extraction, the light can circulate in the resonator with low losses.

Pulse amplification then occurs as follows. Initially, the modulator is set so that most of the light in the cavity is coupled out of the cavity. In this initial state, the power is below the laser threshold and no lasing occurs. The pump energy in the cavity is stored primarily in the gain medium. Next, the modulator is switched so that the cavity losses are reduced to small parasitic losses. In this switched state, the power in the cavity builds up quickly, typically within a few hundred cavity round-trip times. Finally, the modulator is quickly set so that most of the light is again coupled out of the cavity. In this final stage, the energy in the cavity is extracted in about one round-trip time. The cycle is then repeated.

An advantage of cavity dumping over Q-switching is that prior to extraction of a pulse, the energy in the cavity is stored in the electric field inside the cavity, rather than in the gain medium. As a result, the energy can be extracted much more quickly than for Q-switching, typically, in one round-trip time. This, in turn, allows for high repetition rates for cavity dumping, which is highly desirable for many applications, such as industrial machining, drilling, cutting and surface engineering.

Cavity dumping for ultrashort pulses is mostly used with mode-locked solid state bulk lasers, such as titanium-sapphire lasers or diode-pumped neodymium-doped or ytterbium-doped lasers. The pulse energy from a cavity-dumped, mode-locked laser may typically be about an order of magnitude higher than with an ordinary mode-locked laser (i.e., typically of the order of 1 microjoule), and the pulse repetition rate can be hundreds of kilohertz or even several megahertz or higher.

A potential issue with cavity-dumped lasers is that the pulse energy can undesirably depend on the time between pulses, particularly for fast repetition rates.

One may think of a relaxation time in the cavity, during which the intracavity energy oscillates before reaching a steady-state value. If the repetition rate is sufficiently low, then the system reaches its steady state prior the next cavity dumping event. Therefore, the pulse energies of upcoming output pulses are generally stable over time (because energy of the output pulse is proportional to the intracavity energy at the instant of cavity dumping). In this regime, the intracavity energy at the instant of ejecting the pulse may occur in the relatively flat steady state region. If the repetition rate is changed by a user, or a pause is inserted between pulses, the intracavity energy does not change much. As a result, the energy of the next output pulse is largely unaffected. For these relatively slow repetition rates, the pulse energy is largely independent of time between pulses.

If, however, the repetition rate is high enough so that the intracavity energy does not sufficiently settle to its steady-state value, then the next pulse ejection may occur during the oscillations. Here, the intracavity energy at the instant of ejecting the pulse may occur on a rapidly-changing oscillation, rather than on the relatively flat steady-state region. If the repetition rate is changed or a pause is inserted between pulses, the intracavity energy may vary significantly. As a result, the energy of the next output pulse may be significantly affected by the time between pulses, which may be undesirable.

As a specific example, consider the case in which a user would like several trains of pulses at a high repetition rate, but with each train starting at a prescribed time determined by the user, so that the delay between the last pulse of the previous train and the first pulse of the upcoming train can vary train-to-train. For this case, the first pulse in each train may have a pulse energy that varies train-to-train, which is undesirable.

The undesirable variation in pulse energy is illustrated more fully in FIGS. 1 and 2, and the detailed explanation that follows.

Consider a continuously pumped, mode-locked, cavity-dumped laser 1 shown in FIG. 1. Two mirrors 4 and 9 define the laser cavity, which also typically contains a gain medium 6, a mode locker 5 and a controllable switch 2 (or "cavity-dumper"). The energy inside the laser cavity (or "intracavity energy") takes the form of a pulse that bounces back and forth between the two mirrors. For each round-trip pass of the pulse in the cavity, the pulse passes twice through the gain medium 6. The pump for the gain medium 6 remains on throughout operation of the laser. For each pass of the pulse through the cavity-dumper 2, the cavity-dumper 2 can either allow the intracavity energy to remain inside the cavity, or direct the intracavity energy out of the cavity into an output beam 14. The cavity-dumper 2 typically has a polarizer 8 and an electro-optic modulator 7, which is driven electrically by a controller 3. The electro-optic modulator 7 rotates the plane of polarization of a transmitted beam, in response to the voltage produced by the controller 3. There is typically a photodiode 10 that receives a small amount of transmitted light through mirror 4 and generates a synchronization signal for the controller 3, so that the cavity dumper 2 may be switched at an appropriate point in the "bounce" of each pulse.

The laser 1 output can be switched "on" and "off" by the controller 3, where the "on" portion produces a stream of pulses, and the "off" portion produces no pulses. The controller is driven by a controller driving signal 11, a portion of which is shown in FIG. 1. The controller driving signal 11 has "on" portions, such as element 15, and "off" portions, such as element 16.

The controller 3 converts the controller driving signal to a modulator driving signal 12, which switches the electro-optic modulator 7 for a particular duration during each pulse roundtrip in the cavity. During the "on" portion corresponding to each pulse, the switched electro-optic modulator 7 changes the polarization state of the traveling pulse so that it is reflected by polarizer 8 and directed out of the cavity into the output beam 14.

The intensity of the output beam contains streams of pulses 13 when the controller driving signal is "on", and is effectively zero when the controller driving signal is "off". The pulses are spaced apart in time by a multiple of the round-trip time of a pulse in the cavity.

Note that for the laser 1, the energy contained in the first pulse is not necessarily constant from train-to-train. For instance, the energy in pulse 17 is less than in pulse 19 but greater than in pulse 20. For this laser, the energy of the first pulse in the train depends on the length of the "off" portion that immediately precedes the train. In particular, the repetition rate of the laser 1 is fairly high, and is comparable to the relaxation rate of the cavity energy. This variation of the energy contained in the first pulse is undesirable, and the cause of this variation is explained in more detail in the paragraphs that follow.

FIG. 2 shows the energies in the cavity 60a and in the output beam 60b in greater detail, as a function of time. Prior to the time interval shown, there is a history of pulses, denoted by element 66, which is relatively unimportant for this discussion.

The history of pulses is long enough so that in region 67, the pulses have a relatively constant energy from pulse-to-pulse. This region is analogous to region 18 in FIG. 1. The pulse repetition rate is f, so that the pulse-to-pulse time is 1/f. The intracavity energy is $E_{steem}$, and the output energy is $E_{Const}$.

Note that each pulse drains the cavity of a certain amount of energy, which is directed into the output beam and forms the pulse. After each pulse, the intracavity energy begins climbing again. The climbing and draining amounts are roughly equal, as long as the pulse repetition rate f remains roughly constant.

Region 68 is analogous to the "off" region between region 18 and pulse 19 in FIG. 1. In this region, the controller driving signal is set to "off", and the modulator driving signal is set so that the polarization of the pulse transmits through the polarizer, and the light pulse remains in the cavity. In this laser, the pump is always on, so that energy continuously enters the laser cavity.

Note that the laser cavity includes both the gain medium and the intracavity energy. The intracavity energy oscillations seen in region 68 indicate that energy "sloshes back and forth" between the gain medium, where it is stored as a population inversion, and the intracavity energy, where it is stored in the electric field. The "sloshing" last for a few oscillations before the intracavity energy settles to a steady-state value, denoted by $E_{steady\text{-}state}$.

There is a characteristic time that describes how long the laser takes to settle to this steady-state value, which may be referred to as a "relaxation time" for the laser cavity. It is assumed for FIG. 2 that the duration of region 68 is comparable to the relaxation time, although this is not a requirement for the operation of the laser. Note that in general, this relaxation time is difficult to adjust in a laser.

Region 69 in FIG. 2 is analogous to the "on" region in FIG. 1 beginning with pulse 19. The controller driving signal 15 is set to "on", the modulator driving signal switches the modulator once for each pulse, so that when switched, the beam reflects off the polarizer and is directed into the output beam. The pulses in the output beam form a train, with the amplitude of the first pulse being different from the amplitudes of the other pulses in the train.

Pulse 61 in FIG. 2 is analogous to pulse 19 in FIG. 1. A substantial portion of the initial intracavity energy, here being fairly close to $E_{steady\text{-}state}$, is directed into the output beam and forms pulse 61. It is seen that the energy contained in pulse 61 may vary significantly from the energy $E_{Const}$ of the pulses found in region 67. After this initial pulse 61, the intracavity energy begins climbing again, in a manner analogous to region 67 and to the leftmost portion of region 68 in FIG. 2. After a few pulses 62, 63 and 64, the pulse energy returns to $E_{Const}$ and the intracavity energy returns to $E_{stream}$, as in region 67.

A drawback to the laser of FIG. 1, with the energy profiles of FIG. 2, is that the first pulse 61 in a train has an energy that may be different from the energies of subsequent pulses 62-65 in the train. And worse, the energy of the first pulse 61 may depend on the length of the "off" region 68 that immediately precedes it. This is undesirable.

Accordingly, there exists a need for a mode-locked, cavity-dumped laser with a high repetition rate, in which the energy of the first pulse of a train is independent of the time between pulse trains, and is essentially equal to the energies of subsequent pulses in the train.

BRIEF SUMMARY OF THE INVENTION

An embodiment is a method of generating a laser output, comprising: amplifying a first laser pulse within a cavity of a laser to establish a second laser pulse propagating along a path within the cavity in a first direction; directing a first fraction of the second laser pulse into a first output arm, wherein a second fraction of the second laser pulse continues to propagate along the path in the first direction; amplifying the second fraction of the second laser pulse within the cavity to establish a third laser pulse propagating along the path within the cavity in a second direction opposite the first direction; directing a third fraction of the third laser pulse into a second output arm, wherein a fourth fraction of the third laser pulse continues to propagate along the path in the second direction; amplifying the fourth fraction of the third laser pulse within the cavity to establish a fourth laser pulse within the cavity; and extracting the third fraction of the third laser pulse from the second output arm to provide the laser output.

Another embodiment is a method of generating output pulses from a laser having a cavity bounded by a first mirror and a second mirror and containing a circulating intracavity pulse, comprising: repeating for a predetermined number of cavity round-trips the sequence of: reflecting the intracavity pulse from the first mirror; retaining the intracavity pulse in the cavity with the cavity dumper; reflecting the intracavity pulse from the second mirror; and retaining the intracavity pulse in the cavity with the cavity dumper; reflecting the intracavity pulse from the first mirror; directing a fraction of the intracavity pulse into a first output arm with a cavity dumper to form a first output pulse; retaining a fraction of the intracavity pulse in the cavity; reflecting the intracavity pulse from the second mirror; retaining the intracavity pulse in the cavity with the cavity dumper; repeating for the predetermined number of cavity round-trips the sequence of: reflecting the intracavity pulse from the first mirror; retaining the intracavity pulse in the cavity with the cavity dumper; reflecting the intracavity pulse from the second mirror; and retaining the intracavity pulse in the cavity with the cavity dumper; reflecting the intracavity pulse from the first mirror; retaining the intracavity pulse in the cavity with the cavity dumper; reflecting the intracavity pulse from the second mirror; directing a fraction of the intracavity pulse into a second output arm with a cavity dumper to form a second output pulse; and retaining a fraction of the intracavity pulse in the cavity.

Another embodiment is a method of generating output pulses from a laser having a cavity bounded by a first mirror and a second mirror and containing a circulating intracavity pulse, comprising: repeating for a predetermined number of cavity round-trips the sequence of: reflecting the intracavity pulse from the first mirror; retaining the intracavity pulse in the cavity with a cavity dumper; reflecting the intracavity pulse from the second mirror; and retaining the intracavity pulse in the cavity with the cavity dumper; reflecting the intracavity pulse from the first mirror; directing the intracavity pulse to the cavity dumper, the intracavity pulse having a total power at incidence upon the cavity dumper; directing with the cavity dumper a first output percentage of the intracavity pulse into a first output arm to form a first output laser pulse; retaining a first retention percentage of the intracavity pulse in the cavity; reflecting the intracavity pulse from the second mirror; directing with the cavity dumper a second output percentage of the intracavity pulse into a second output arm to form a second output laser pulse; and retaining a second retention percentage of the intracavity pulse in the cavity. The first output percentage is a desired output divided by the total power. The first retention percentage is 100% minus the first output percentage. The second output percentage is a cavity dumping ratio minus the first output percentage. The second retention percentage is 100% minus the cavity dumping ratio.

Another embodiment is a laser, comprising: a cavity for containing intracavity light in a first direction and a second direction opposite the first direction; a cavity dumper disposed in the cavity for selectively diverting intracavity light into either or neither of a first output arm or a second output arm, comprising a first polarizer having a first pass axis, a second polarizer having a second pass axis, and a modulator disposed in the laser cavity between the first and second polarizers; and a modulator controller for selectively rotating the polarization of intracavity light traveling in the first direction away from the first pass axis so that intracavity light traveling in the first direction reflects off the first polarizer to form the first output arm, and for selectively rotating the polarization of intracavity light traveling in the second direction away from the second pass axis so that intracavity light traveling in the second direction reflects off the second polarizer to form the second output arm.

DETAILED DESCRIPTION OF THE INVENTION

Figure 1:
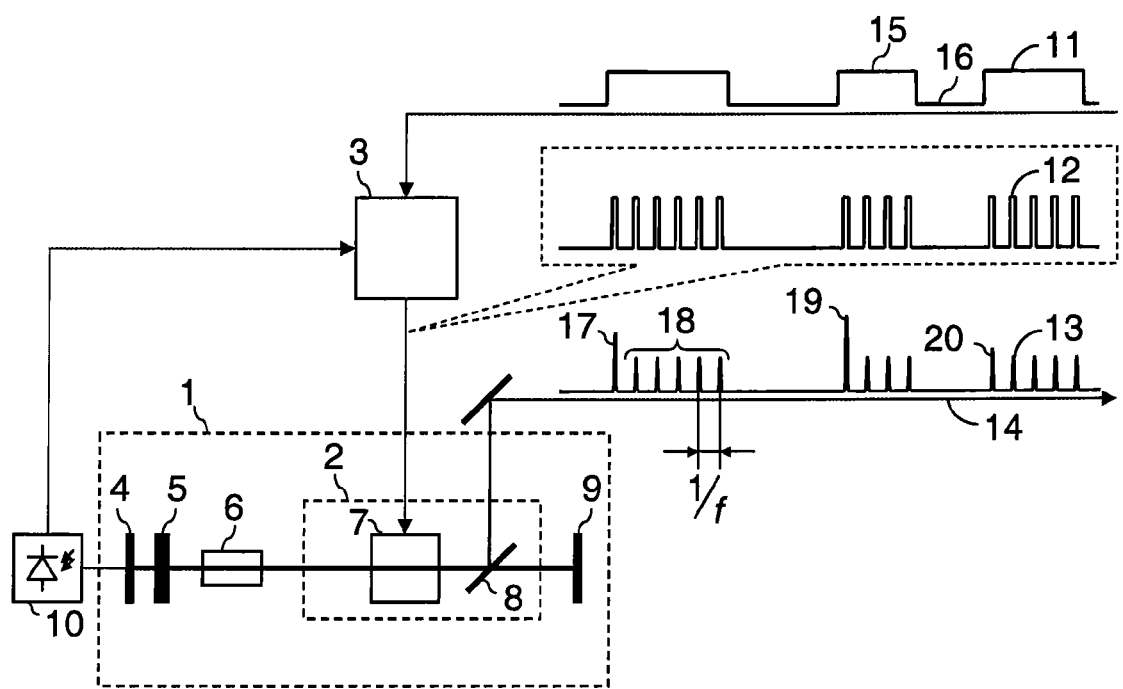
FIG. 1 is a schematic drawing of a repetitively pulsed laser system.

A continuously pumped, mode-locked laser is disclosed, which includes a cavity dumper that can remove a constant fraction of the light from the cavity at every 1/f period of time, independent of the time at which the first pulse in a train is initiated. The cavity dumper includes a modulator and two output arms, denoted as a primary output arm and a secondary output arm. When a user desires a train of pulses, the pulses are directed to the primary output arm. Between trains of pulses, when no pulse is desired by the user, the pulses are directed to the secondary output arm, which terminates in an absorber or at a secondary optical system. In this manner, the energy contained in each output pulse is essentially constant, from pulse-to-pulse and from train-to-train. This may overcome the disadvantage of many lasers that have a single output arm, in which the first pulse in a train may have an energy that depends on the length of the inactive period that immediately precedes the train. The preceding statements are merely a summary of the disclosure, and should not be construed as limiting in any way.

It is worth noting that throughout this document, there is repeated mention of a polarization being "rotated" by an electro-optic modulator. Strictly speaking, an electro-optic modulator being driven by a high voltage functions as a wave plate that introduces a phase difference between the polarization state parallel to the optic axis of the modulator crystal and polarization state perpendicular to the optic axis of the modulator crystal. In general, linearly polarized light may become elliptically polarized upon passing through the modulated crystal. It will be understood that the expression "polarization rotation of about 90 degrees" may mean the "polarization change that gives about 100% cavity dumping". The expression "polarization rotation of more or less than 90 degrees" may mean the "polarization change that gives less than 100% cavity dumping", and so forth. One of ordinary skill in the art will appreciate that the polarization states into and out of the various modulators need not remain strictly linear, but may generally be elliptical. The phase shift between orthogonal polarization components may therefore be effectively ignored in the following discussion.

A laser 21 that overcomes the disadvantages described above is shown in FIG. 3. Note that a second output arm 28 is added to the laser, using a reflection generated by a second polarizer 24 in the cavity dumper 22.

Based on the controller driving signal, the controller 23 now generates a modulator driving signal or voltage 25 that either directs the pulses to a first output arm 14 (analogous to the "on" state described earlier), or to a second output arm 28 (analogous to the "off" state described earlier).

The pulses 26 in the first output arm 14 now have essentially equal energies from pulse-to-pulse. The energy of the first pulse in the train is largely independent of the "off" period that immediately precedes it, and is essentially equal to the energies of subsequent pulses in the train. In this manner, the laser 21 overcomes the disadvantages described earlier.

Figure 3:
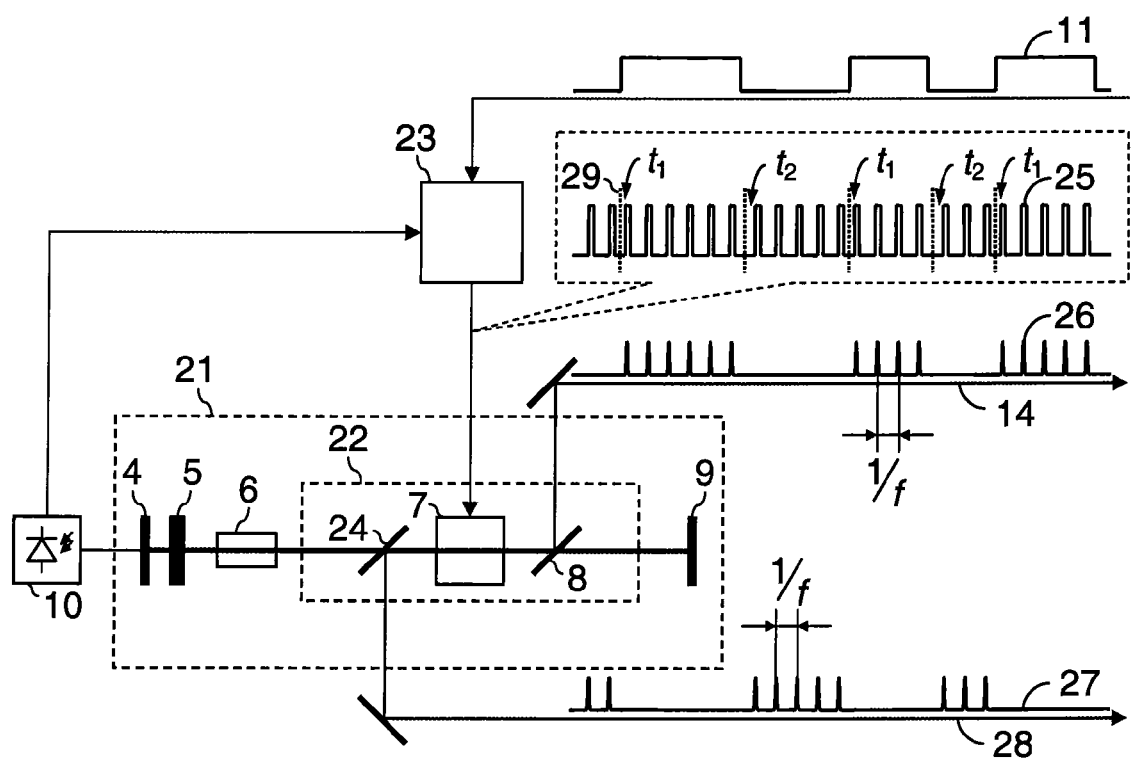
FIG. 3 is a schematic drawing of another repetitively pulsed laser system.
Figure 7:
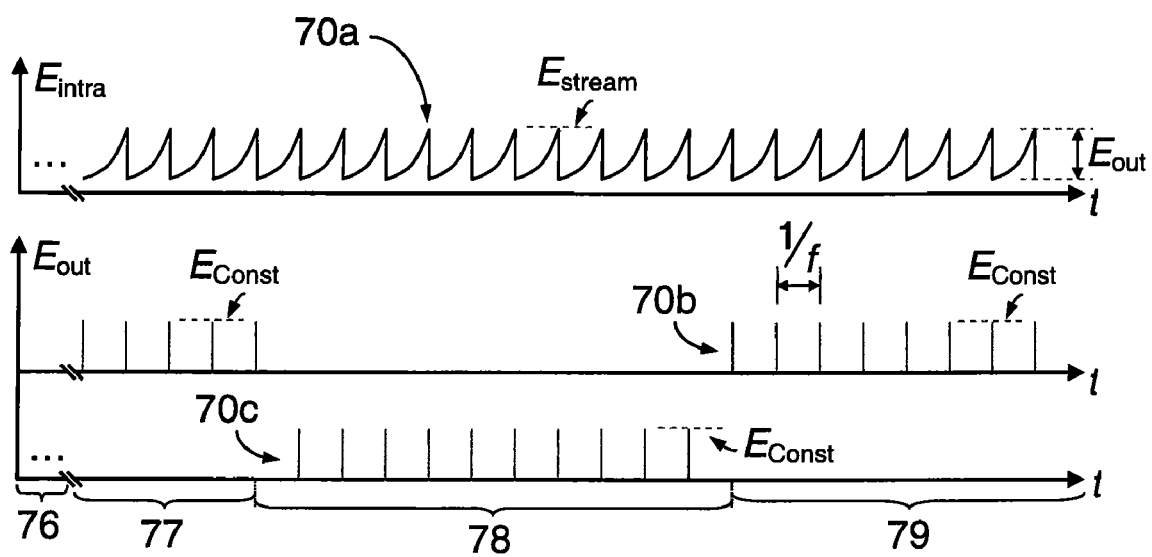
FIG. 7 is a graph of the intracavity energy and output energy of the laser of FIG. 3.

FIG. 7 shows the intracavity energy 70a, the output beam at the first output arm 70b and output beam at the second output arm 70c, for the laser 21 of FIG. 3. Prior to the time interval shown, there is a history of pulses, denoted by element 76, which is relatively unimportant for this discussion.

Region 77 shows an "on" state, in which the pulses are directed into the first output arm. Region 78 shows an "off" state, in which the pulses are directed into the second arm, which can terminate in an absorber or can propagate to a second, additional optical system. Region 79 is also an "on" state.

Figure 2:
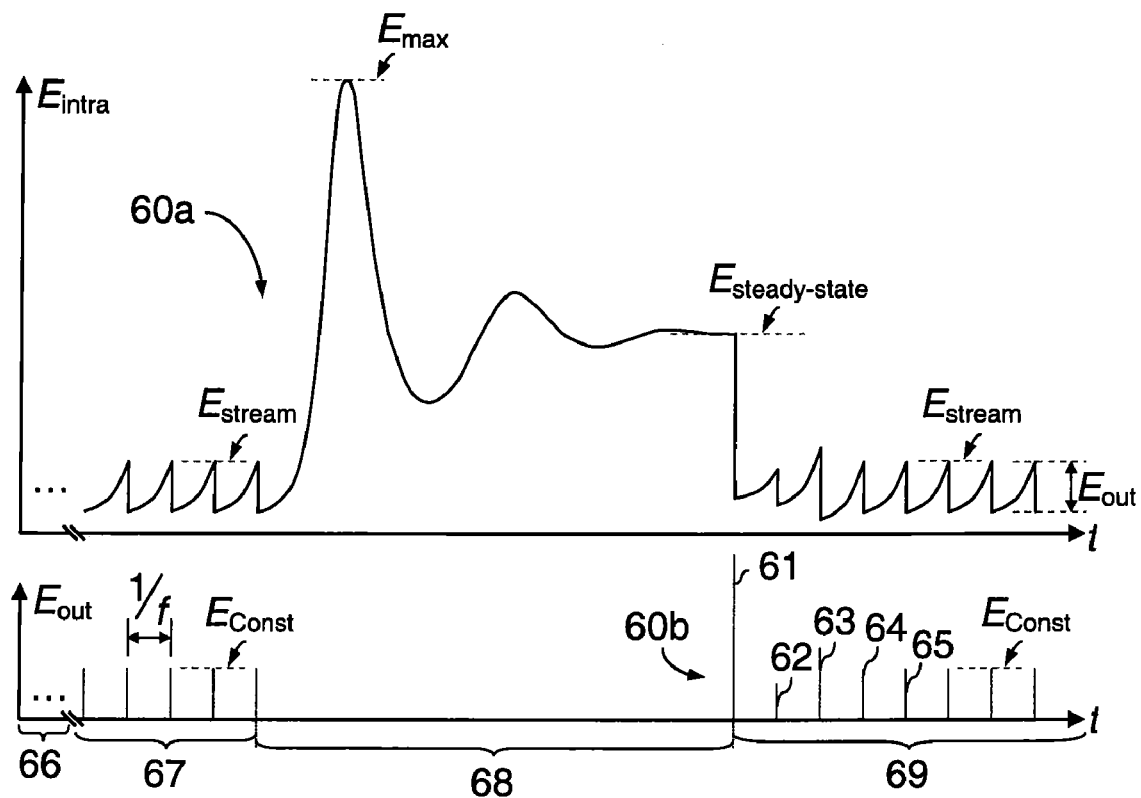
FIG. 2 is a graph of the intracavity energy and output energy of the laser of FIG. 1.

The intracavity energy 70a has a regular sawtooth-shaped pattern, rising from a minimum value to a maximum value, and dropping back down to the minimum value. Note that the peak intracavity energy is constant for all regions 77, 78 and 79 and is equal to $E_{stream}$, and that the pulses in both output arms all have a peak energy of $E_{Const}$, regardless of the length of the "off" region 78. This is in contrast to the pulse energies shown in FIG. 2 for the laser of FIG. 1, which depend on the length of the "off" period 68 that precedes the first pulse in the train. This uniformity of the pulse energy from pulse-to-pulse and from train-to-train is quite desirable, and is a significant advantage over the laser of FIG. 1.

The second output arm may or may not be used by the laser operator. The pulses in the second output arm 28 may be directed to an absorber, or may be directed an additional optical system that uses the pulses, effectively doubling the potential usage of the laser 21.

The polarizers 8 and 24 are similar in nature and are essentially parallel, so that the electro-optic modulator 7 can switch between transmitting through both polarizers, or reflecting off the polarizers. Because the energy in a mode-locked laser may be thought of as a pulse that oscillates between the mirrors in the laser cavity, the electro-optic modulator 7 can choose to reflect off one polarizer or the other polarizer by precisely timing the portions at which the beam polarization is rotated.

For instance, if the output energy is to be reflected off polarizer 8 and directed into output arm 14, then the electro-optic modulator 7 should rotate the polarization of the pulse as it is traveling from left-to-right in FIG. 3 as the pulse passes through the modulator 7.

Likewise, if the output energy is to be reflected off polarizer 24 and directed into output arm 28, then the electro-optic modulator 7 should rotate the polarization of the pulse as it is traveling from right-to-left in FIG. 3 as the pulse passes through the modulator 7.

In this manner, by carefully controlling the times at which the electro-optic modulator is switched, the intracavity energy may be directed into either output beam. Compared to a reference time 29, switching the modulator at times $t_1$ (or at multiples of 1/f, plus $t_1$) directs the pulses 26 into output arm 14, and switching the modulator at times $t_2$ (or at multiples of 1/f, plus $t_2$) directs the 27 pulses into output arm 28. Note that the difference ($t_2$ minus $t_1$) corresponds the time it takes a pulse to travel from the modulator 7 to the cavity mirror 9 and back to the modulator 7. These timing issues are shown more explicitly in FIG. 4.

Figure 4:
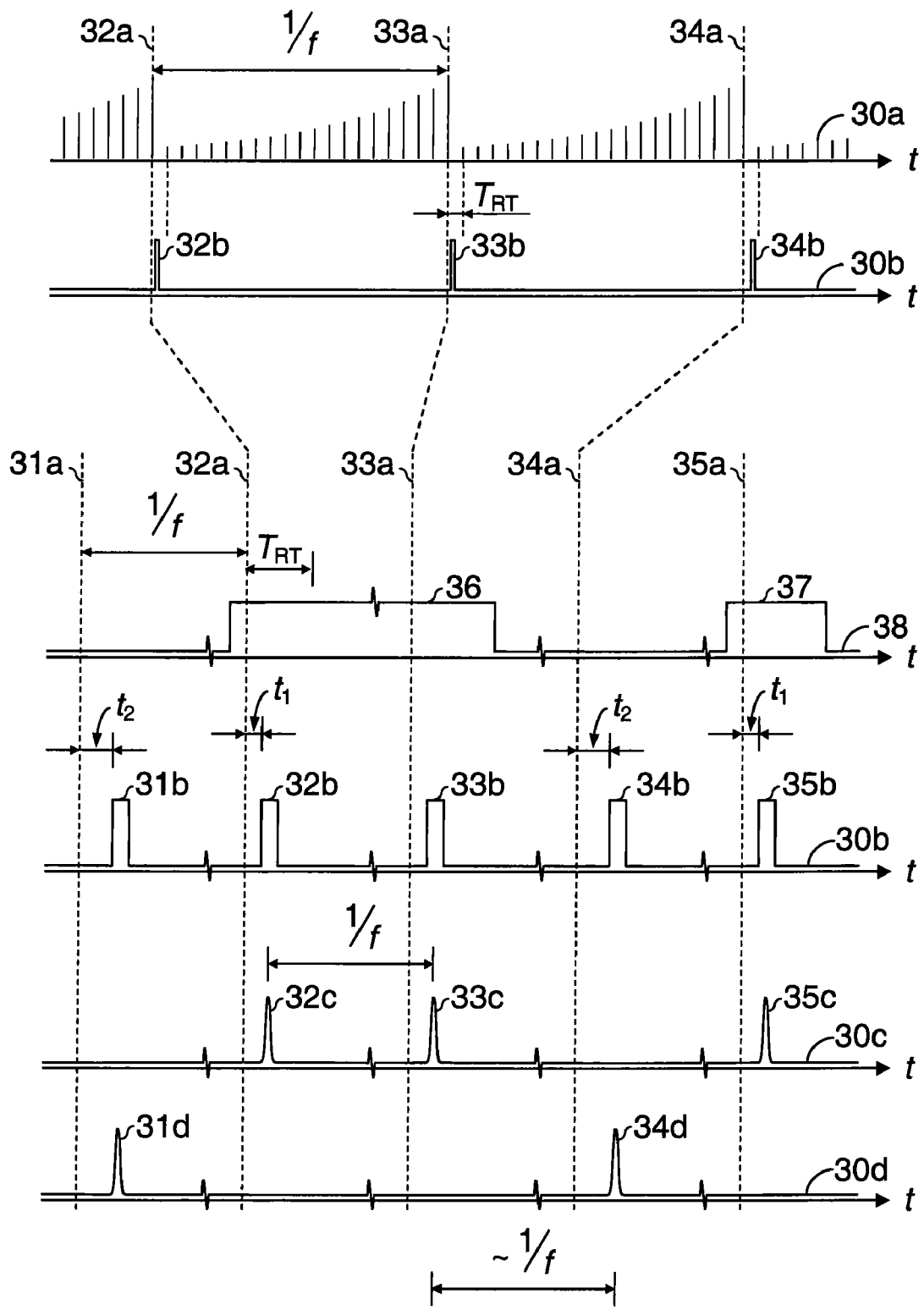
FIG. 4 is a schematic drawing of the pulse timing sequence of the laser of FIG. 3.

The topmost plot 30a in FIG. 4 is intracavity energy versus time. Note that the intracavity energy of plot 30a is measured at a particular location in the cavity, such as the mirror 4. The actual location at which the intracavity energy is measured is relatively unimportant; one may measure that intracavity energy at any location in the cavity by horizontal shifting the x-axis in plot 30a. In other words, while the absolute values of $t_1$ and $t_2$ do depend on the location of said measurement, the difference ($t_2$ minus $t_1$) does not depend on the location of said measurement. The reference times 31a-35a are separated by the inverse of the repetition rate, 1/f. The times 31a-35a may be considered to be the time at which an intracavity pulse strikes the cavity mirror 4, for the particular round-trip at which cavity dumping occurs.

The round-trip time of the pulses in the cavity is denoted by $T_{RT}$. The pulse repetition rate is f, with a time between pulses given by 1/f. Note that 1/f is a multiple of $T_{RT}$. Pulses are released after times 32a, 33a and 34a, each of which decreases the intracavity energy to a small but non-zero level.

The next plot down, 30b, is the modulator driving signal. Within a single round-trip time after times 32a, 33a and 34a, the modulator is switched so that the intracavity energy is directed to one of the two output arms. The relative times at which the modulator is switched, relative to 32a, 33a and 34a, are shown in further detail in the four bottommost plots in FIG. 4.

Plot 38 is the controller driving signal. When the signal is at a relatively high voltage, as in regions 36 and 37, the pulses are directed into the first output arm. This is analogous to the "on" state described above. When the signal is at a relatively low voltage, the pulses are directed into the second output arm, for either absorption or for use in an additional optical system. This is analogous to the "off" state described above. It will be readily understood by one of ordinary skill in the art that the roles of "off" and "on" may be reversed, and that the first and second output arms may be reversed.

Plot 30b is the modulator driving signal, produced by the controller 23 in response to the controller driving signal 38 and to a synchronization signal (not shown) generated by photodetector 10. The synchronization signal peaks once every pulse round-trip, and provides a reference for times $t_1$ and $t_2$.

When the controller driving signal is "high", as in regions 36 and 37, the delay time at which the modulator is switched, for the first pulse in each train, is $t_1$. Likewise, when the controller driving signal is "low", the delay time at which the modulator is switched, for the first pulse in each train, is $t_2$.

Plots 30c and 30d are the energies in the first and second output arms, respectively. In the first output arm, pulses 32c, 33c and 35c are produced by switching pulses 32b, 33b and 35b, respectively. In the second output arm, pulses 31d and 34d are produced by switching pulses 31b and 34b, respectively.

As indicated at the bottom of FIG. 4, the time between pulses in the first and second output arms is roughly 1/f. Strictly speaking, the time is $1/f +/- (t_2$ minus $t_1)$, although in practice the quantity ($t_2$ minus $t_1$) is much smaller than 1/f and may often be neglected.

Note that there is typically some residual energy intentionally left in the cavity after a reflection off the polarizer, which serves as the initial intracavity energy for the next pulse and improves the stability of the laser. A quantity known as the "cavity dumping ratio" is the fraction of the total intracavity energy that is extracted for each amplification cycle. Typical cavity dumping ratios may be roughly 80%, although any suitable value may be used. The cavity dumping ratio may be controlled in part by hardware, by setting the s-polarized reflectivity of the polarizers 8 and 24 to the cavity dumping ratio, rather than to 100%. Alternatively, the cavity dumping ratio may be controlled in part by software, by applying a suitable modulating driving voltage that rotates the plane of polarization to an orientation slightly away from s-polarization, so that the reflectivity off the polarizers 8 and 24 equals the cavity dumping ratio. It will be understood by one of ordinary skill in the art that the cavity dumping ratio may be easily controlled in a known manner, so that the output arms receive a fraction less than 100% (equal to the cavity dumping ratio) of the intracavity energy, rather than 100%.

The discussion up to this point has centered around producing trains of laser pulses that all have uniform energy, from pulse-to-pulse and from train-to-train. In addition, the laser 21 of FIG. 3 may also be used to produce pulses that have a variable or adjustable energy, by varying the modulator driving signal. No additional hardware is required.

In FIG. 4, note that the modulator driving signal 30b is either at a high level (31b through 35b), or at a low level (everything else). These levels correspond to the polarization states that reflect and transmit through the polarizers, respectively. These polarization states are 90 degrees apart, and may be referred to as s- and p-polarization states, vertical and horizontal polarization states, into the page and parallel to the page (with respect to FIG. 3), or any other suitable naming convention. For these polarization states, the reflectivity of the polarizer is essentially 100% and 0%, respectively, or as close as practical. In practice, the high reflectivity state (corresponding to 31b through 35b) may be less than 100% reflectivity (the polarization rotation of less or more than 90 degrees is produced at the electro-optic modulator), in order to retain some energy in the cavity.

Figure 5:
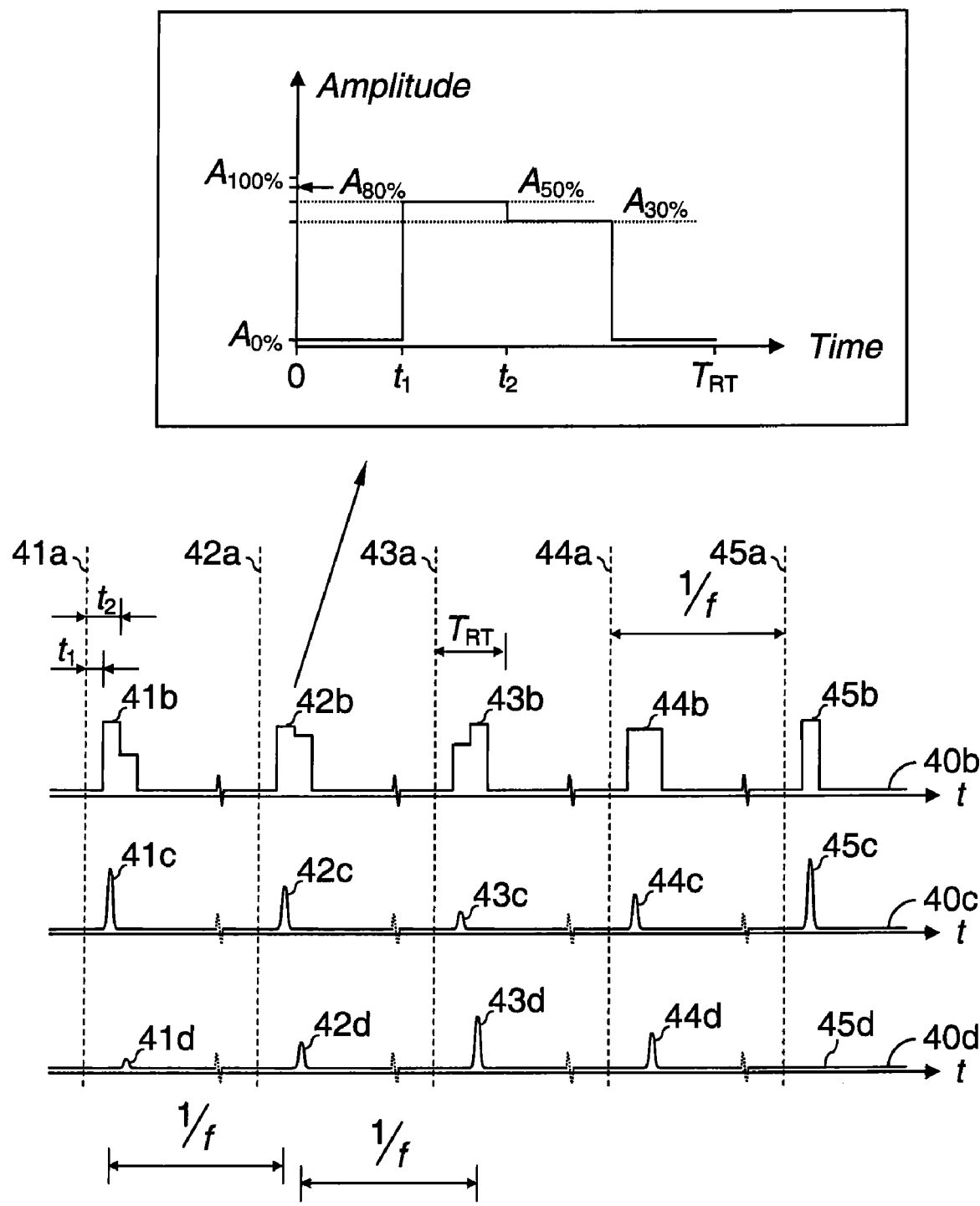
FIG. 5 is a schematic drawing of another pulse timing sequence of the laser of FIG. 3.

In contrast with FIG. 4, the modulator driving signal 40b of FIG. 5 may be at varying levels between the high level and low level of FIG. 4. That means, reflectivities at the polarizer can vary anywhere between 0% and a predetermined value less than 100% (or as close as practical).

The numerical relationships between driving voltage and polarization rotation for the electro-optic modulator are easily determined, either by routine experimentation or by documentation provided by the manufacturer of the modulator. The relationship between polarization orientation and reflectivity is determined by Malus's Law, which says that if the angle between the beam polarization and the reflected polarization state (typically s-polarization) is theta, then the reflected optical power is proportional to $\cos^2(\text{theta})$. As a result, it becomes straightforward to numerically relate the modulator driving voltage to the reflectivity of each polarizer; this relationship may be stored in a lookup table, may be calculated dynamically, or a combination of both.

The laser 21 may produce pulses with a desired pulse energy R (expressed as a fraction of the intracavity energy) in the following manner. The modulator driving voltage is varied so that during the left-to-right pass of the pulse through the modulator 7, the polarization is rotated to give a reflectivity of R at the polarizer 8 corresponding to the first output arm 14. On the right-to-left pass of that same pulse through the modulator 7, the polarization is rotated to give a reflectivity of (the cavity dumping ratio minus R) at the polarizer 24 corresponding to the second arm 28. Note that $A_{80\%}$ in the inset of FIG. 5 is the amplitude of the modulator driving signal (voltage) that gives a reflectivity of 80%, and so forth.

FIG. 5 shows the modulator driving voltage 40b and the output energies 40c and 40d for the first and second output arms 14 and 28, for various desired pulse energies.

For each of the pulses in FIG. 5, the cavity dumping ratio is 80%, meaning that in the pulse round-trip during which the intracavity energy is directed into one or both output arms, 20% of the intracavity energy remains in the cavity. The value of 80% is merely exemplary, and any suitable value may be used.

The reference times 41a-45a are separated by the inverse of the repetition rate, 1/f. The times 41a-45a may be considered to be the time at which an intracavity pulse strikes the cavity mirror 4, for the particular round-trip at which cavity dumping occurs. The time $t_1$ corresponds to the time that a pulse takes to travel from the cavity mirror 4 to the modulator 7. The time $t_2$ corresponds to the time that a pulse takes to travel from the cavity mirror 4 to the opposing cavity mirror 9 and back to the modulator 7. In other words, the time difference ($t_2$ minus $t_1$) is the time it takes a pulse to travel from the modulator 7 to the mirror 9 and back to the modulator 7.

For pulse 41, the desired pulse energy is 70%. For the first portion of the pulse, between times $t_1$ and $t_2$ and corresponding to the time at which a pulse traveling left-to-right passes through the modulator 7, the modulator driving voltage is set so that the reflectivity off polarizer 8 is 70%. For the second portion of the pulse, after $t_2$ and corresponding to the time at which the same pulse traveling right-to-left passes through the modulator 7, the modulator driving voltage is set so that the reflectivity off polarizer 24 is 10%. The pulse energy 41c in the first output arm is therefore 70%. The pulse energy 41d in the second output arm may optionally be directed to an absorber. After this round-trip pass, 80% of the intracavity energy is dumped into the output arms, and 20% remains in the cavity.

For pulse 42, the desired pulse energy is 50%. In a manner similar to pulse 41, the modulator driving voltage is chosen so that 50% of the intracavity energy is directed into the first output arm and forms the desired output pulse, 30% is directed into the second output arm and may be directed to an absorber, and 20% (=100% minus the cavity dumping ratio) remains in the cavity.

Pulse 43 has a desired pulse energy of 20% in the first output arm, with 60% going into the second output arm and 20% remaining in the cavity.

Pulse 44 has a desired pulse energy of 40% in the first output arm, with 40% going into the second output arm and 20% remaining in the cavity.

Pulse 45 has a desired pulse energy of 80% in the first output arm, with 0% going into the second output arm and 20% remaining in the cavity.

Note from the expanded view of voltage 42b that the relationship of driving voltage to polarizer reflectivity may be non-linear, and may be determined in a known manner described above.

It is instructive to devote some attention to the issue of stability. In an optical system as complex as a high-repetition-rate pulsed laser, it should not be surprising that instabilities can occur. The following discussion provides some guidance as to how to avoid one particular type of instability, known as "bistability". Note that bistability is not fully understood at present. The following paragraphs provide a possible explanation of bistability, although with the caveat that this is only one possible explanation, which has not been proven.

Figure 6:
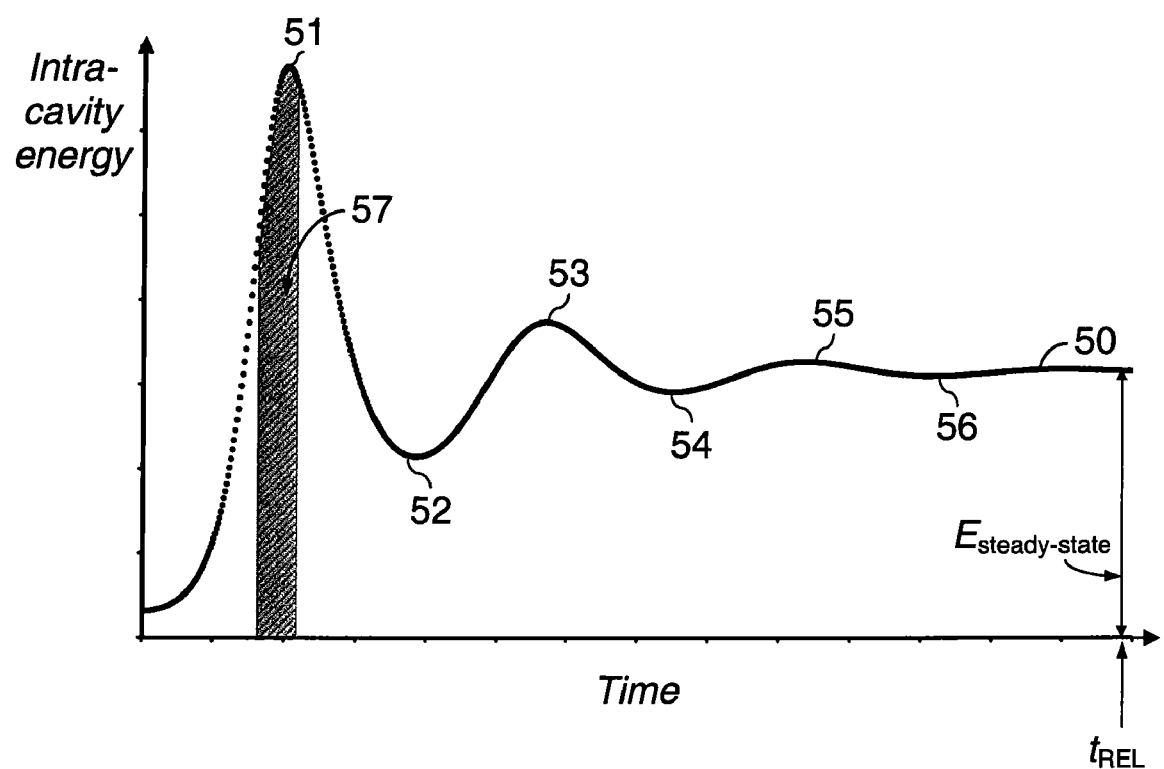
FIG. 6 is a graph of one laser cycle of the intracavity energy after cavity dumping of the laser of FIG. 3.

Consider the plot shown in FIG. 6, which shows the intracavity energy versus time for a typical, continuously-pumped laser, but in the absence of any cavity dumping. The gain medium is continuously pumped, so that energy enters the gain medium at a constant rate. Energy "sloshes" back and forth between the gain medium, where the energy is stored as a population inversion, and the intracavity energy, where the energy is stored in the electric field. The amplitude of the "sloshing" decays at a particular rate, and the intracavity energy settles to a steady-state value after a particular relaxation time, $t_{REL}$.

If the laser emits a pulse after the intracavity energy reaches its steady-state, then the intracavity energy is decreased quickly by the cavity dumping ratio, which occurs during one round-trip pass of the pulse in the cavity. With a sudden drop in the intracavity energy, the system is moved to a non-steady-state, and the "sloshing" begins again, with energy being transferred from the gain medium to the electric field in the cavity, and back.

One may think of the system "resetting" to a point along the curve 50 at which the energy (y-axis) is decreased. For instance, if after a cavity dump, the energy is dropped to a level near the leftmost side of the plot, then the behavior in time follows the curve shown in FIG. 6; the intracavity energy rises to a peak 51, then drops to a local minimum 52, then rises to a local maximum 53, then a minimum 54, then a maximum 55, then a minimum 56, and so forth until the oscillations become sufficiently damped and the intracavity energy settles once again back to its steady-state value.

When the laser operates in a pulsed mode, an important parameter is the pulse repetition rate. If the repetition rate is sufficiently slow, so that there is sufficient time to settle to the steady-state value or something close to it, then the above behavior repeats in a predictable manner. One may think of a pulse "resetting" the energy to a point at the left side of the plot in FIG. 6, then time elapsing as the intracavity energy stabilizes, then the next pulse being initiated at a point near the right side (or past the right side) of the plot in FIG. 6.

As the repetition rate increases, there is less and less time for the intracavity energy to stabilize. One may think of the next pulse occurring at a time that is farther to the left in the plot of FIG. 6. At extremely high repetition rates, the intracavity energy may not even make it to its first peak 51 before the cavity is dumped. This is the case for many of the 1/f-separated pulses in FIGS. 2 and 7; the curved "sawtooth" behavior between pulses derives its shape from the steep, upward-curving, leftmost edge of the intracavity energy curve 50.

Note that the very leftmost edge of the intracavity energy becomes fairly horizontal in shape. If the cavity dumping ratio is too large, the pulse may "reset" the curve to an intracavity energy below this leftmost edge. If this occurs, the intracavity energy may require extra time to reach the levels shown by curve 50, which may be somewhat unpredictable. As a result, the system may become unstable, with irregularly spaced pulses, or irregular pulse energies. This region of instability occurs if the time between pulses 1/f falls near the region of the first peak 51, and is labeled as region 57 in FIG. 5.

Figure 8:
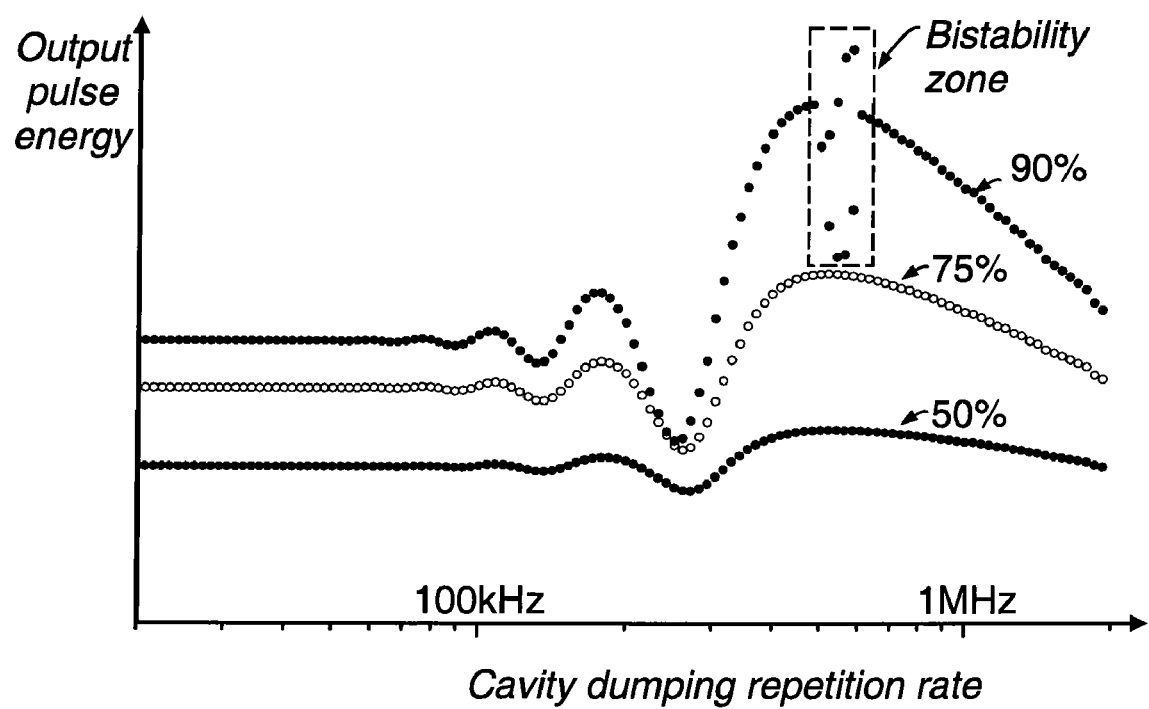
FIG. 8 is a graph of the output pulse energy as a function of cavity dumping repetition rate and of cavity dumping ratio of the laser of FIG. 3.

More specifically, FIG. 8 shows the effects of both pulse repetition rate and cavity dumping ratio on stability. For fairly high cavity dumping ratios, near the region of the first peak (analogous to peak 51 in FIG. 6), a phenomenon called "bistability" may occur.

In bistability, successive pulses in a train alternate between two different energy values, each of which may remain constant over time. Typically, the user of the laser wants only a single value for the pulse energy, not alternating values, and bistability is, in general, undesirable. Note again that the previous discussion provides only one possible explanation for bistability, a phenomenon that has been documented but at present is not well understood. This discussion of bistability should not be construed as limiting in any way.

In FIG. 8, the labels of 50%, 75% and 90% for the cavity dumping ratios are merely exemplary, and should not be construed as limiting in any way. Actual values may depend on the optical properties of the components in the laser cavity. Furthermore, the time scale of the x-axis is merely exemplary, and may change if the laser cavity is lengthened or compressed.

It is instructive to show the various stages of an exemplary pulse being diverted to each of the two output arms.

Figure 9:
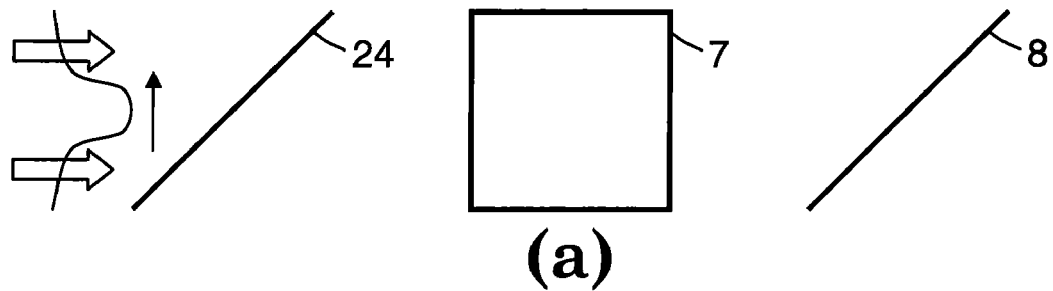
FIG. 9 is a schematic drawing of a laser pulse being directed into an output arm of the laser of FIG. 3.
Figure 9:
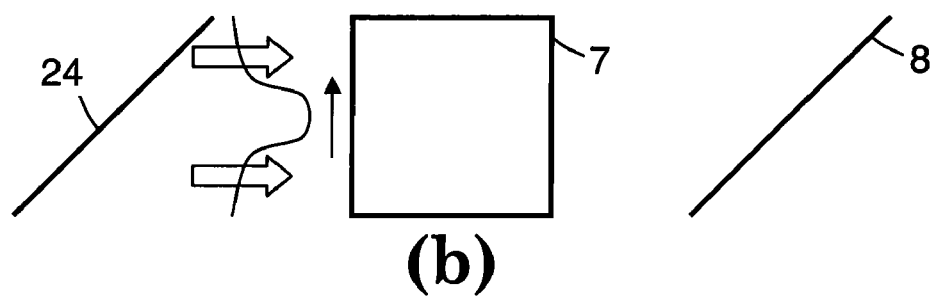
Figure 9:
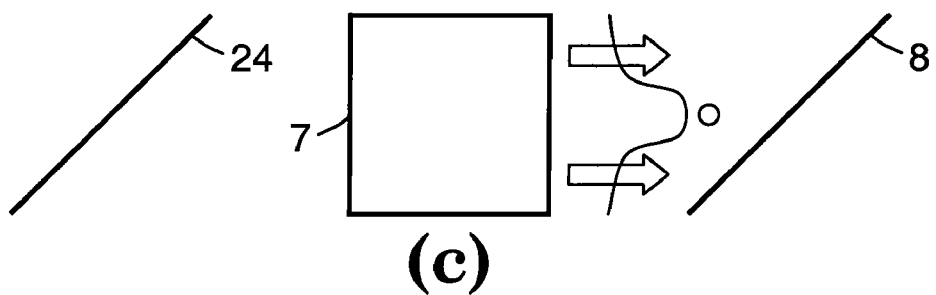
Figure 9:
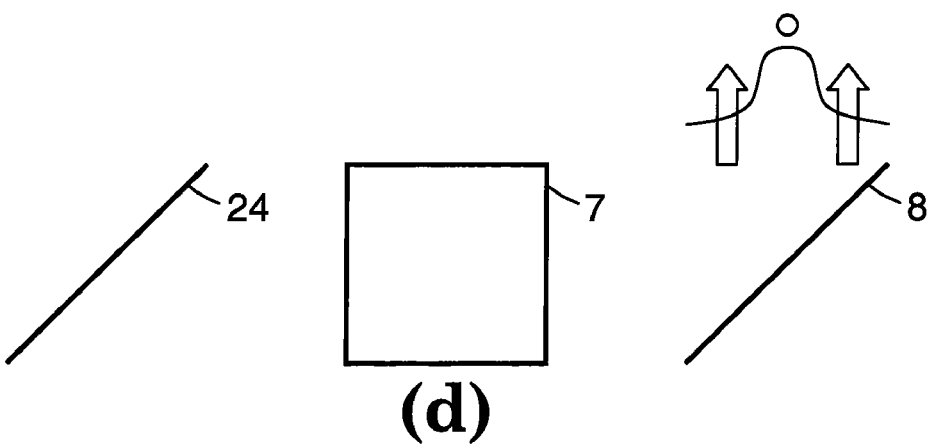
Figure 10A:
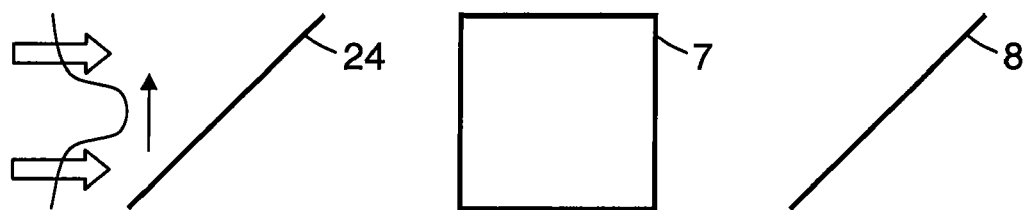
FIG. 10 is a schematic drawing of a laser pulse being directed into another output arm of the laser of FIG. 3.
Figure 10A:
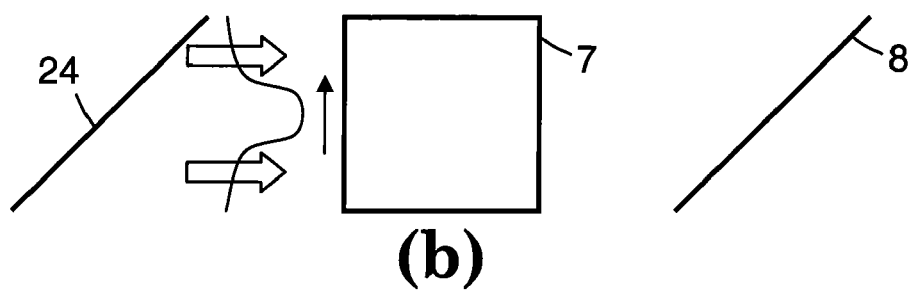
Figure 10A:
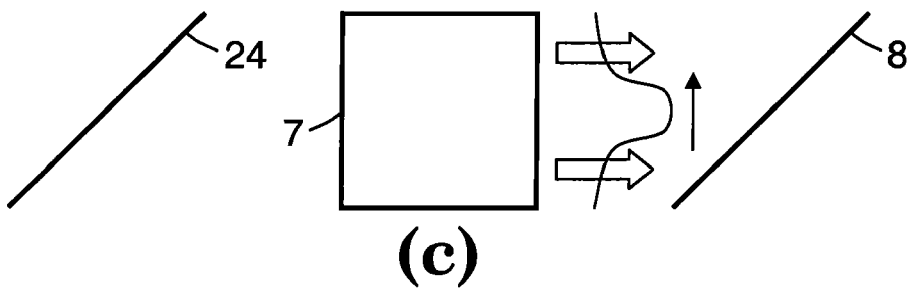
Figure 10A:
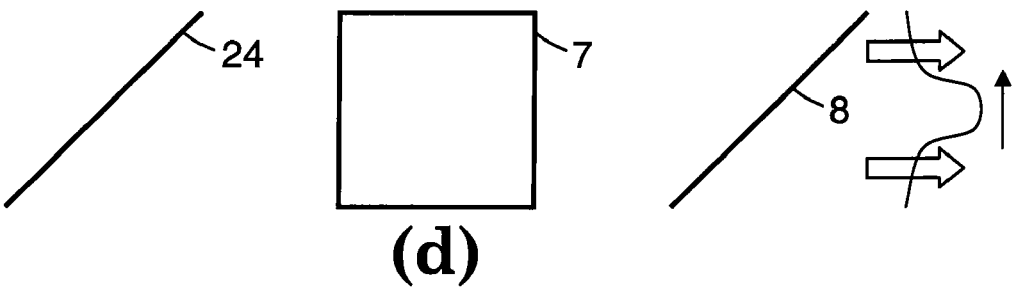
Figure 10B:
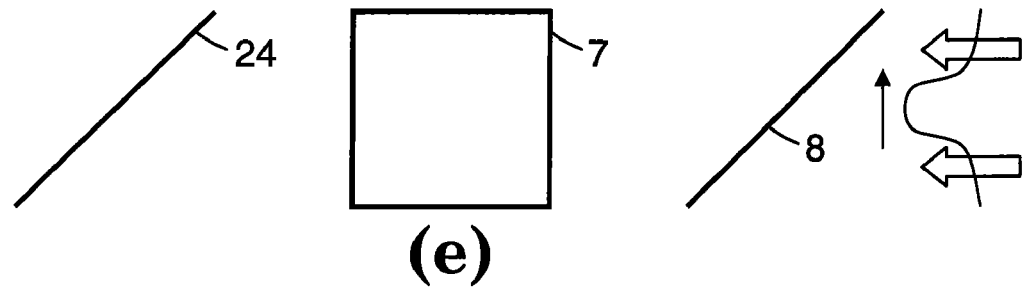
Figure 10B:
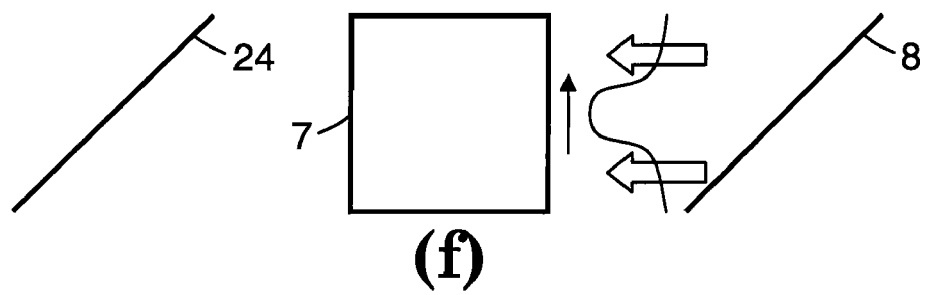
Figure 10B:
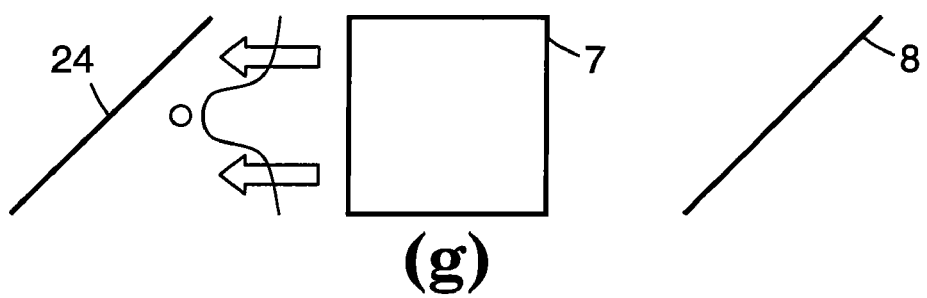
Figure 10B:
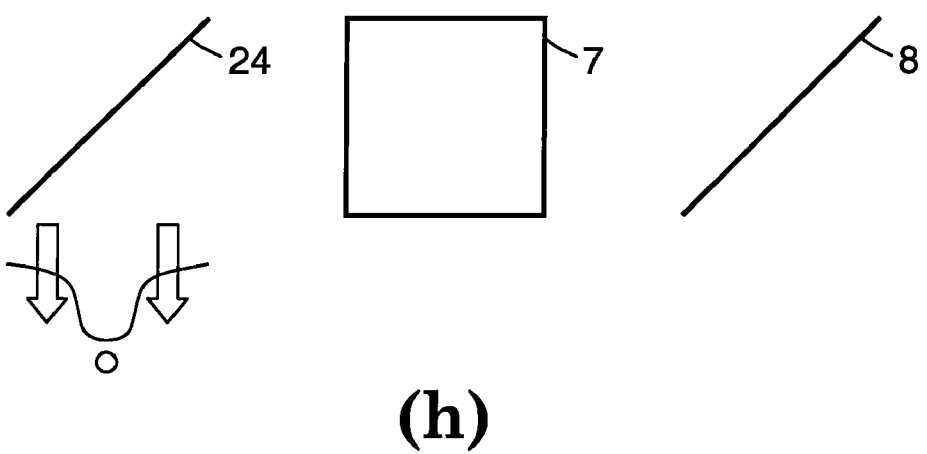

FIG. 9 shows a pulse to be directed into output arm 14. The pulse is initially traveling left-to-right, along with its polarization state. Initially, at stage (a), the polarization is in the plane of the page.

Typically, polarizers such as 24 and 8 reflect s-polarization and transmit p-polarization, although this is not a strict requirement. Either or both polarizers may alternatively reflect p- and transmit s-polarization. Furthermore, the polarizer may be "leaky", and may transmit a fraction of p-polarized light with its s-transmission, or may reflect a fraction of s- along with its p-reflection. The initial polarization of the beam at stage (a) is generally aligned with the pass axis of the polarizer 24.

The beam transmits through polarizer 24, as shown in stage (b). The polarization is still in the plane of the page.

Between stages (b) and (c), the beam passes through the modulator 7, which is driven by a modulator driving voltage (not shown). The driving voltage is set so that modulator rotates the plane of polarization by about 90 degrees. At stage (c), the polarization of the beam is out of the page.

The beam is s-polarized, with respect to the polarizer 8, and reflects off polarizer 8 (generally—polarization is perpendicular to the pass axis of the polarizer 8). The reflected beam, at stage (d) is directed into output arm 14, as shown in FIG. 3.

It should be noted that it is often desirable to leave a fraction of the light in the cavity, rather than directing it all into output arm 14. This may be achieved easily, by adjusting the modulator driving voltage so that the rotation is less (or more) than 90 degrees, thereby producing a small p-polarized component (in the page with respect to FIG. 9) at stage (c), which is transmitted through polarizer 8 at stage (d) and remains in the cavity to initiate the next pulse. The fraction of light sent to the output arm may be referred to as the "cavity dumping ratio", and typical cavity dumping ratios may be 50%, 70%, 80%, 90%, 95%, or any suitable value.

FIG. 10 (broken up over two pages into 10A and 10B) shows a pulse to be directed into the other output arm 28. The pulse is initially traveling left-to-right, along with its polarization state.

Initially, at stage (a), the polarization is in the plane of the page.

The beam transmits through polarizer 24, as shown in stage (b). The polarization is still in the plane of the page.

In contrast with FIG. 9, the modulator 7 is driven by a voltage that does not rotate the plane of polarization of the transmitted beam. The beam emerges from the modulator 7 at stage (c) with its polarization still in the plane of the page.

At stage (d), the beam has transmitted through the polarizer 8. Between stages (d) and (e), the beam has reflected off mirror 9 (not shown in FIG. 10) and any optional intervening optical elements, and has returned to polarizer 8 with its polarization still in the plane of the page.

The beam transmits through polarizer 8, as shown in stage (f).

Between stages (f) and (g), the modulator 7 is driven by a voltage that rotates the plane of polarization by about 90 degrees, so that the polarization state at stage (g) is essentially out of the page (or s-polarized with respect to polarizer 24). As described above, in practice, it is desirable to leave a fraction of the light in the cavity, so the polarization rotation may be more or less than 90 degrees.

The beam now reflects off polarizer 24, as in stage (h), and is directed to output arm 28 (not shown in FIG. 10).

Figure 11:
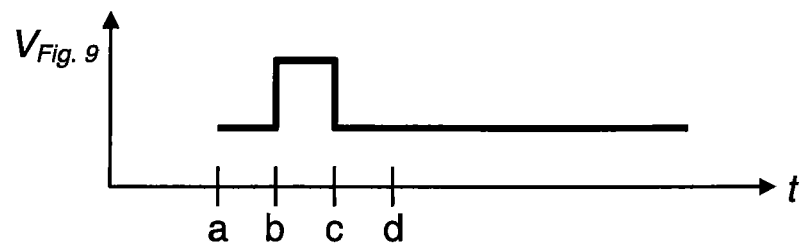
FIG. 11 is a plot of the modulator controller signals that direct the laser pulses into the output arms shown in FIGS. 9 and 10.
Figure 11:
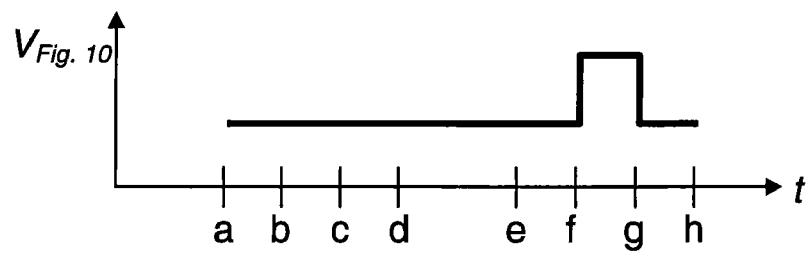

The timing of the modulator driving signal is important. It is important to drive the modulator so that it catches the pulse traveling in one direction but not the other, so that the cavity energy may be dumped within one round-trip of the pulse in the laser cavity. An exemplary set of driving voltages are shown in FIG. 11, for the cases shown in FIGS. 9 and 10. In each of these plots, the "low" voltage corresponds to no polarization rotation. Likewise, the "high" voltage corresponds to a sufficient rotation to direct a fraction of the light into the output arm, where the fraction is the cavity dumping ratio.

For FIG. 9, the polarization rotation occurs between stages "b" and "c". For FIG. 10, the polarization rotation occurs between stages "f" and "g", with essentially no rotation between stages "b" and "c". The x-axis has no absolute "zero", but the various stages "a" through "h" correspond to the same points in the round-trip of each pulse in the cavity. For instance, "zero" in both plots may correspond to the time at which the circulating pulse hits mirror 4, although this is not a requirement.

The difference in time between stages "b" and "f", or equivalently, stages "c" and "g", is roughly equal to the round-trip time of the pulse as it travels from the modulator 7 to the mirror 9 and back. The pulse travels at the speed of light.

As an alternative to the geometry of FIGS. 9 and 10, in which the polarizers 24 and 8 are parallel, either or both may be rotated about the optical axis of the cavity, so that one or both output arms may extend out of the page. In this case, the modulator 7 may be driven by a signal that produces a polarization rotation that aligns the transmitted beam with the pass axis of the respective polarizers 24 and 8.

The cavity dumper 22 of FIG. 3 is shown having a single modulator 7, located in the cavity between two inclined polarizers 24 and 8. There are many possible variations of this cavity dumper construction, several of which are shown in FIGS. 12 through 17. In each of these figures, the modulators are all drawn schematically as squares, the inclined polarizers are drawn schematically as 45-degree diagonal lines, and the arrows show the direction of travel of a beam as it exits the cavity into an output arm.

Figure 12:
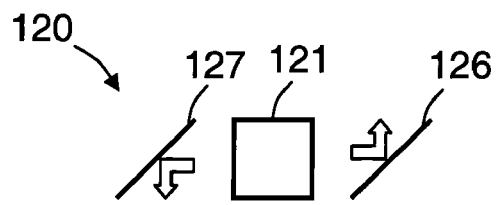
FIG. 12 is a schematic drawing of a cavity dumper.

For instance, FIG. 12 shows the cavity dumper 120 variation of FIG. 3, having a single modulator 121 surrounded by two inclined polarizers 126 and 127.

Figure 13:
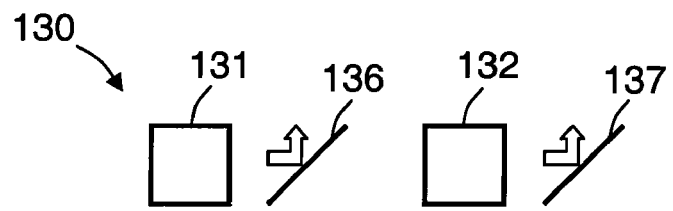
FIG. 13 is a schematic drawing of another cavity dumper.

FIG. 13 shows a cavity dumper 130 having two modulators 131 and 132, and two inclined polarizers 136 and 137. Each modulator 131, 132 is paired with its own polarizer 136, 137, respectively. The modulators 131 and 132 both direct a right-traveling pulse to the output arms.

Figure 14:
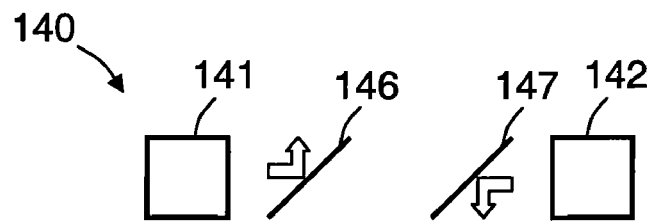
FIG. 14 is a schematic drawing of another cavity dumper.

FIG. 14 shows a cavity dumper 140 having two modulators 141 and 142, and two inclined polarizers 146 and 147. Each modulator 141, 142 is paired with its own polarizer 146, 147, respectively. The modulator 141 directs a right-traveling pulse to an output arm, while the modulator 142 directs a left-traveling pulse to another output arm.

Figure 15:
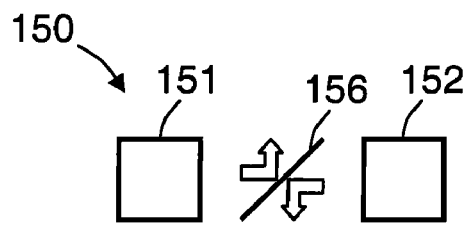
FIG. 15 is a schematic drawing of another cavity dumper.

FIG. 15 shows a cavity dumper 150 having two modulators 151 and 152, and a single inclined polarizer 156 between the modulators 151 and 152. The modulator 151 directs a right-traveling pulse to an output arm, while the modulator 152 directs a left-traveling pulse to another output arm. Note that polarizer 156 includes the functions of both polarizers 146 and 147, while eliminating a component. In this manner, the cavity dumper may piggyback off one or more polarizers already present in the laser cavity, so that the polarizer may serve more than one function in the laser.

Figure 16:
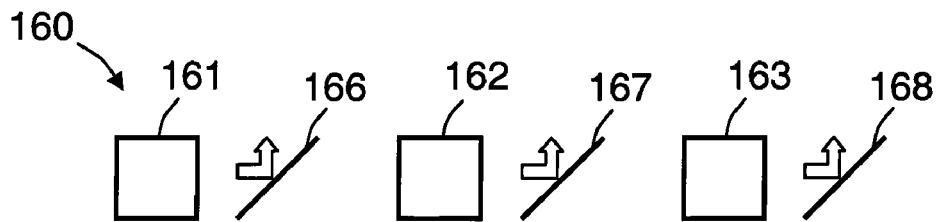
FIG. 16 is a schematic drawing of another cavity dumper.

FIG. 16 shows a cavity dumper 160 having three modulators 161, 162 and 163, and three inclined polarizers 166, 167 and 168. Each modulator 161, 162, and 163 is paired with its own polarizer 166, 167, and 168, respectively. In this manner, the number of output arms may be extended to three, four, five, six or more.

Figure 17:
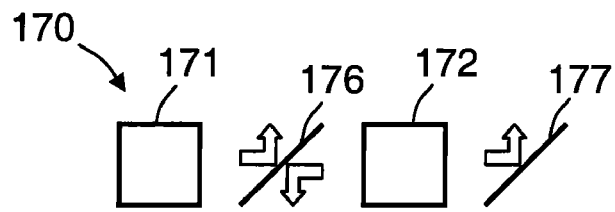
FIG. 17 is a schematic drawing of another cavity dumper.

FIG. 17 shows a cavity dumper 170 having two modulators 171 and 172, and two inclined polarizers 176 and 177. Polarizer 176 serves two output arms, one from a left-traveling pulse and one from a right-traveling pulse. In this manner, the cavity dumper may piggyback off one or more modulators already present in the laser cavity, so that the modulator may serve more than one function in the laser. For example, the modulator 171 may function in the cavity dumper for a right-traveling pulse, but may be part of a switch or a cavity loss control mechanism (not shown) for a left-traveling pulse.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A method of generating output pulses from a laser having a cavity bounded by a first mirror and a second mirror and containing a circulating intracavity pulse, comprising:
    repeating for a predetermined number of cavity round-trips the sequence of:
        reflecting the intracavity pulse from the first mirror;
        retaining the intracavity pulse in the cavity with a cavity dumper;
        reflecting the intracavity pulse from the second mirror; and
        retaining the intracavity pulse in the cavity with the cavity dumper;
    reflecting the intracavity pulse from the first mirror;
    directing the intracavity pulse to the cavity dumper, the intracavity pulse having a total power at incidence upon the cavity dumper;
    directing with the cavity dumper a first output percentage of the intracavity pulse into a first output arm to form a first output laser pulse;

retaining a first retention percentage of the intracavity pulse in the cavity;

reflecting the intracavity pulse from the second mirror;

directing with the cavity dumper a second output percentage of the intracavity pulse into a second output arm to form a second output laser pulse; and retaining a second retention percentage of the intracavity pulse in the cavity;

wherein the first output percentage is a desired output divided by the total power;

wherein the first retention percentage is 100% minus the first output percentage;

wherein the second output percentage is a cavity dumping ratio minus the first output percentage;

wherein the second retention percentage is 100% minus the cavity dumping ratio;

wherein the cavity comprises a cavity dumping repetition rate;

wherein the cavity has a characteristic profile of output pulse energy versus cavity dumping repetition rate, the characteristic profile including a first peak for the cavity dumping ratio;

wherein the cavity dumping repetition rate is away from the first peak having a bistability zone, and wherein a energy of a first pulse of a train is essentially equal to the energies of subsequent pulses in the train.

2. The method of claim 1, wherein the first output percentage is zero and the second output percentage is the cavity dumping ratio.

3. The method of claim 1, wherein the first output percentage is the cavity dumping ratio and the second output percentage is zero.

4. A laser, comprising:

a cavity for containing intracavity light in a first direction and a second direction opposite the first direction;

a cavity dumper disposed in the cavity for selectively diverting intracavity light into either or neither of a first output arm or a second output arm, comprising a first polarizer having a first pass axis, a second polarizer having a second pass axis, and a modulator disposed in the laser cavity between the first and second polarizers; and a modulator controller for selectively rotating the polarization of intracavity light traveling in the first direction away from the first pass axis so that intracavity light traveling in the first direction reflects off the first polarizer to form the first output arm, and for selectively rotating the polarization of intracavity light traveling in the second direction away from the second pass axis so that intracavity light traveling in the second direction reflects off the second polarizer to form the second output arm;

wherein the cavity comprises a cavity dumping repetition rate and a cavity dumping ratio;

wherein the cavity has a characteristic profile of output pulse energy versus cavity dumping repetition rate, the characteristic profile including a first peak for the cavity dumping ratio;

wherein the cavity dumping repetition rate is away from the first peak having a bistability zone, and wherein a energy of a first pulse of a train is essentially equal to the energies of subsequent pulses in the train.

5. The laser of claim 4, further comprising:

a mode locker disposed in the cavity for forming a pulse that circulates in the cavity and alternates between first and second directions;

a continuously pumped gain medium disposed in the cavity for amplifying the circulating pulse; and a photodiode for monitoring the position of the pulse in the cavity, and for generating a synchronization signal.

6. The laser of claim 5, wherein the modulator controller receives the synchronization signal and drives the modulator with a time-synchronized driving signal that selectively rotates the plane of polarization when the pulse passes through the modulator;

7. The laser of claim 6, wherein the time-synchronized driving signal includes first and second signal pulses;

wherein the first signal pulses start at a first time with respect to the synchronization signal;

wherein the second signal pulses start at a second time with respect to the synchronization signal; and wherein the difference between first and second times corresponds to a round-trip time between the modulator and a cavity mirror.

* * * * *